Patented May 5, 1931

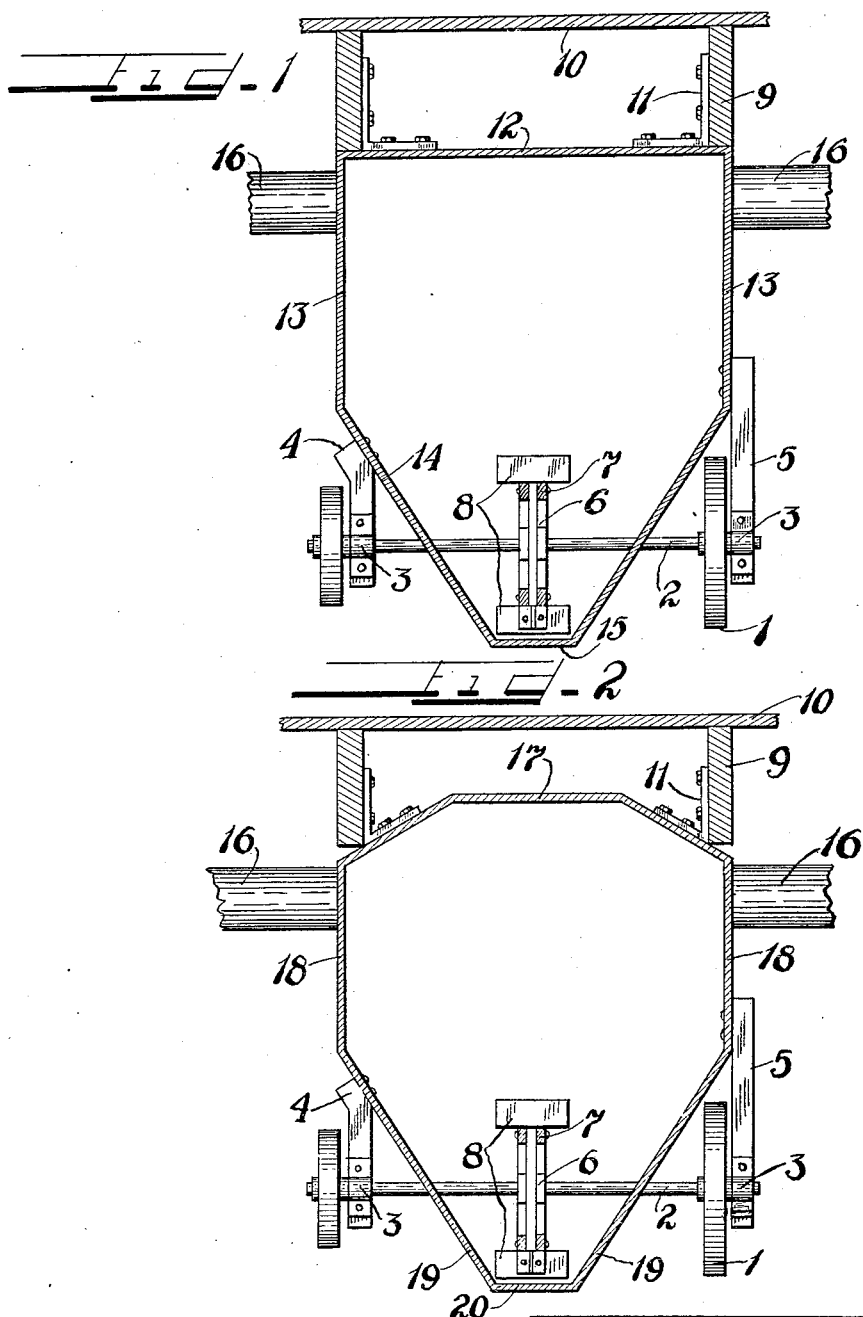

1,804,147

UNITED STATES PATENT OFFICE

RAYMOND E. CALLER, OF NEW YORK, N. Y.

CONDUIT FOR DUST COLLECTING SYSTEMS

Application filed May 31, 1929. Serial No. 367,274.

This invention relates to dust collecting systems of the character shown in my Patent No. 1,610,358, dated December 14, 1926, and pertains more particularly to an improved type of conduit or main trunk of a dust collecting system wherein the main trunks are equipped with high air velocity producing means and with means for conducting along the bottom of said trunk, miscellaneous materials, including dust, which are by-products usually obtained in woodworking establishments and the like.

It is an object of this invention to provide a dust collecting system with an improved type of main conduit having a predetermined or selected cross section formed to permit the branch pipes to be connected to substantially the widest portion of the main conduit at substantially the highest level thereof to produce a nearly ideal condition for a dust collecting system.

It is also an object of this invention to provide a dust collecting system with an improved conduit having a predetermined or selected cross section having a widest portion thereof at the uppermost level of the conduit to facilitate mounting of the branch pipes not only at the widest portion of the conduit but also at substantially the top thereof to permit material to be admitted into the widest and uppermost portion of the conduit permitting the heavier materials to lodge on the bottom where means are provided to feed the materials through the trunk line.

It is a further object of this invention to provide a main trunk or conduit for a dust collecting system, with said trunk or conduit having a cross section, the upper portion of which is substantially square, while the lower portion is tapered and terminates in a flat bottom.

It is an important object of this invention to provide a main conduit or trunk line for a dust collecting system, said conduit or trunk line having a cross section the lower tapered portion of which joins an upper portion which is substantially uniform from the top of the tapered section to the uppermost portion of the conduit or trunk line affording an arrangement permitting the branch feed pipes of the system to be connected not only to the widest portion of the conduit or trunk line but to the uppermost portion thereof to produce an ideal condition for a dust collecting system.

Other and further important objects of this invention will be apparent from the disclosures in the specification and the accompanying drawings.

This invention (in a preferred form) is illustrated in the drawings and hereinafter more fully described.

On the drawings:

Figure 1 is a transverse sectional view of a dust collecting pipe system using an improved main conduit or trunk line embodying the principles of this invention.

Figure 2 is a similar transverse sectional view illustrating a modified form of main conduit or trunk line.

As shown on the drawings:

The improved dust handling or conveying system of this invention includes the use of air as a conveyance of miscellaneous materials and dust through main conduit or trunk lines of an elected cross section. The system in which the improved conduit or trunk lines of this invention are used is described in detail in the earlier patent hereinbefore referred to. The parts of the dust collecting system illustrated in the drawings briefly comprise a pulley 1 adapted to be driven by means of a belt connected with any suitable sort of driving power. The pulley 1 is supported on a shaft 2 journalled in suitable bearings 3 mounted on brackets 4 and 5, the brackets 4 and 5 being rigidly secured on the lower side portions of an improved main conduit or trunk line embodying the principles of this invention. If desired the brackets 4 and 5 may be rigidly secured in place on any other suitable support such as a framework or the like. The shaft 2 projects transversely through the lower portion of a main conduit or pipe line and carries a sprocket 6 around which an endless chain is engaged. The endless chain 7 carries a plurality of spaced drags or paddles 8. The endless chain 7 has the other end or bight portion thereof engaged around a suitable sprocket also supported within the pipe system.

Secured to the rafters 9 of a ceiling 10 are a plurality of supporting angle brackets 11 to the horizontal flanges of which the straight top plate 12 of an improved main conduit or pipe line is rigidly secured. The improved main conduit of the dust collecting system of this invention is of a selected configuration or cross section comprising the straight top wall 12 and two parallel side walls 13 which together with the top wall 12 forms a top section of substantially rectangular cross section permitting the uppermost portion of the main conduit to be equal in width to the greatest width of said main conduit. The lower end of the side walls 13 integrally connect up with the lower tapered section of the main conduit which lower section comprises two straight inclined lower side walls 14 which converge and have the ends thereof intergrally connected with a flat bottom 15. The improved main conduit or trunk line may be constructed of any desired material and is shaped to provide a predetermined cross section, the upper portion of which is of uniform width while the lower portion is tapered to accommodate the conveying means with the lower lap of said conveying means positioned to run parallel with the bottom 15 of the conduit with the conveyor drags or paddles 8 spaced a short distance from the bottom 15 so that when the driving mechanism operates the endless conveyor, the material within the conduit may be fed therethrough.

In delivering material to a dust collecting system main conduit or pipe line it has been found highly desirable to admit the material near to the top of the conduit and at the widest portion thereof to obtain a high efficiency of the system. The material is delivered to the main conduit or pipe line through a plurality of branch pipes 16 which are connected to the side walls 13 of the conduit at the widest portion thereof and as near to the top plate 12 as possible. This requirement is fulfilled in the use of the improved main conduit of the cross section illustrated in Figure 1 wherein the widest portion of the conduit is located at the upper portion of the conduit.

When material is delivered through the branch pipes 16 into the widest upper portion of the conduit said material is permitted to be separated by gravity and by air currents passing through the main conduit. The heavier materials delivered into the main conduit are permitted to collect in the tapered bottom section of the conduit and are carried along by the conveying means while the lighter materials such as dust and the like remain in the upper wide section of the main conduit and are carried therethrough by rapidly moving air currents produced in the system by blower mechanisms or other suitable devices as disclosed in the earlier patent referred to.

In the modified form of the device illustrated in Figure 2, the various parts corresponding with the parts illustrated in Figure 1 have the same reference numerals applied thereto. In this form of the device, however, the main conduit or trunk line comprises a slightly convex top 17 the longitudinal margins of which are integrally connected to a pair of parallel side walls 18 which together with the slightly convex upper wall 17 provide an upper conduit section of a type permitting the branch pipes 16 to be connected at the widest portion of the main conduit and at substantially the top portion of the top section to provide an ideal arrangement for a dust collecting system. The lower margins of the main conduit side walls 18 integrally connect up with substantially straight inclined lower side walls 19 which converge and have the ends thereof rigidly connected with a flat bottom 20. The wide upper section of the conduit illustrated in Figure 2 permits material from the branch pipe 16 to be discharged into substantially the upper portion of said upper section permitting the heavier material to be collected in the bottom of the conduit while the lighter materials such as dust and the like remain in the wide upper portion of the conduit and are carried therethrough by rapidly moving air currents.

While conveyor mechanisms have been illustrated and described as a means for moving the materials through the conduits or trunk lines, it will of course be understood that any other suitable means may be used for advancing materials through the conduit over the flat bottoms.

It will, of course, be understood that many changes may be made and that numerous details of construction may be varied through a wide range without departing from the principles of this invention and it is therefore not purposed limiting the patent granted hereon otherwise than necessitated by the scope of the appended claims.

I claim is my invention:

1. In a dust collecting system a main conduit having a top, and having an upper relatively wide portion with spaced parallel straight walls and a lower portion having converging sides, and branch conduits communicating with the said main conduit through the straight walls thereof, and at the upper part of the walls.

2. In a dust collecting system, a main conduit having a top, and having an upper relatively wide and substantially square portion with spaced parallel straight walls, and a lower portion with converging sides, and branch conduits communicating with the said main conduit through the straight walls thereof, and positioned adjacent the top thereof.

In testimony whereof I have hereunto subscribed my name at New York, New York County, New York.

RAYMOND E. CALLER.